N. R. KRAUSE.
SPRING CONTROLLER FOR VEHICLES.
APPLICATION FILED JUNE 1, 1920.
1,379,992. Patented May 31, 1921.
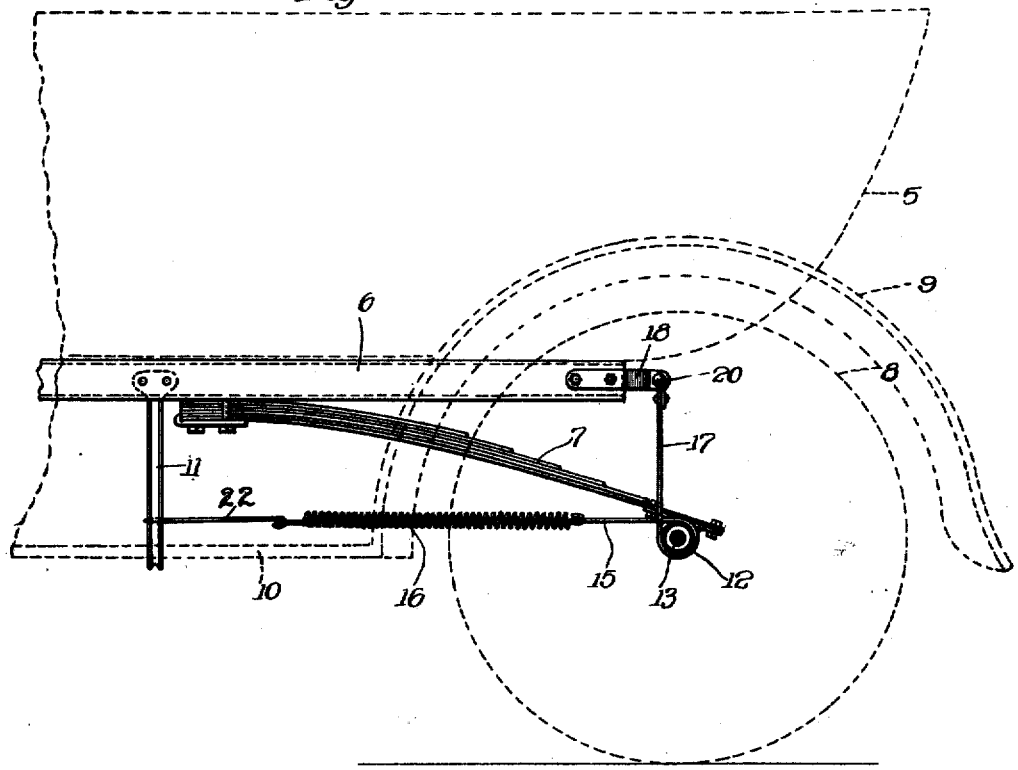
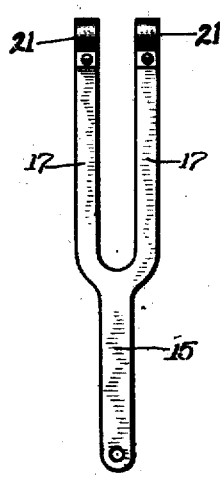
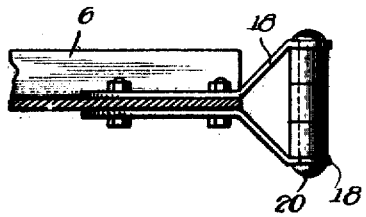
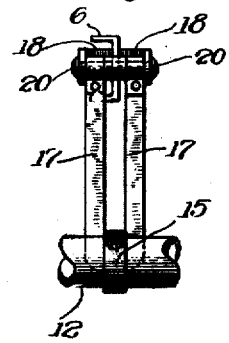
Inventor.
Norman R. Krause,
By James A. Walsh.
Atty
Witness

UNITED STATES PATENT OFFICE.

NORMAN R. KRAUSE, OF RACINE, WISCONSIN, ASSIGNOR OF ONE-FOURTH TO WILLIAM F. SAWYER, OF RACINE, WISCONSIN, AND ONE-FOURTH TO JAMES A. WALSH, OF INDIANAPOLIS, INDIANA.

SPRING-CONTROLLER FOR VEHICLES.

1,379,992.     Specification of Letters Patent.     Patented May 31, 1921.

Application filed June 1, 1920. Serial No. 385,470.

*To all whom it may concern:*

Be it known that I, NORMAN R. KRAUSE, a citizen of the United States, residing at Racine, in the county of Racine and State of Wisconsin, have invented certain new and useful Improvements in Spring-Controllers for Vehicles, of which the following is a specification.

In the operation of motor vehicles it is a common practice in passing through ruts or over obstructions to be subjected to violent jolting, the body of the vehicle through the resiliency of the springs over which it is mounted undergoing a sudden downward and upward movement, much to the discomfort of and possible injury to the occupants, as well as a serious detriment to the vehicle, for the reason that the weight and pressure of such body causes the springs to be forced downwardly to substantially their limit of movement and to instantly rebound, their inherent force throwing them upwardly beyond their normal position and thus imparting an undue strain directly upon the parts connected thereto, and to the vehicle generally. It is the object of my present invention to provide simple and inexpensive means for ready attachment to a vehicle whereby the force of the vehicle springs is controlled in their movement and checked in their rebound, so that under the conditions stated when the body suddenly descends it will be caused to gradually return to its normal position without being subjected to violent jolting so commonly experienced in the use of motor vehicles.

In the accompanying drawings, forming part hereof, Figure 1 is a fragmentary side elevation of a motor vehicle, parts thereof being shown in dotted lines, while my improved device and the parts with which it communicates are in full lines; Fig. 2 a plan of my device: and Figs. 3 and 4 are views showing the manner of attaching and assembling the same.

In said drawings the portions marked, 5, indicate the vehicle body, 6, the frame, 7, a common form of spring employed in such vehicles, 8, a wheel, 9, a fender, 10, a running board, 11, a support therefor, 12, the axle housing, and, 13, the rear axle, all of which are common and well known, and form part of many types of motor vehicles now in use.

My invention is a snubber designed to check motion, which may be arranged and attached to the vehicle in substantially the following manner. The snubber proper (Fig. 2) is composed of flexible material, and I have found in actual practice that leather is highly suitable, but desire to be understood as not limiting myself to the employment of any particular material for the purpose. Said snubber preferably comprises a tongue, 15, and the strands, 18, the latter being suitably attached to the frame of the vehicle, brackets, 18, bolted to a frame member (Fig. 3) indicating a practical method, which brackets support a pin, 20, about which the ends, 21, of the strands 17 are looped and secured by rivets or otherwise. When attached to said frame the snubber is looped around the axle housing 12, the tongue 15 thereof being passed forwardly between the strands and is anchored by a spring, 16, connected to the end thereof and to the support 11 or other part of the vehicle in any suitable manner, that indicated being a hook, 22, by which such attachment can be readily made. By passing said tongue 15 between the strands 17 in the manner indicated, I provide a neat arrangement of the parts, and one that will insure that the tongue portion of the snubber will be retained within a guide and thus maintain its normal position about the axle housing without liability of slipping sidewise. It will be understood, however, that an ordinary strap may be employed with a winding wrap or convolution about said housing, the latter being provided with clips or other means for preventing the side slipping of such strap, but such an arrangement would be unsightly and detract from the appearance of a vehicle; and it may be further understood that a supplemental element may be provided if desired for looping the snubber, instead of employing an axle or its housing for that purpose.

In operation (two snubbers are employed, one being placed at each side of the vehicle), when the vehicle passes into a depression or over an obstruction, the body thereof forces springs 7 downwardly, and during such movement springs 16 are constantly pulling upon tongue 15, thereby gripping the snubber about axle housing 12, so that when springs 7 reach their limit of downward movement, which may vary according to circumstances, and the tendency thereof is to violently rebound upwardly, they must overcome the friction caused by the gripping of the snubber about said axle housing by the pulling action of springs 16, which friction checks their spring force and retards the reverse movement thereof, with the result that such friction and the pulling against springs 16 cause the vehicle body and its frame to gradually and steadily move upwardly and return to normal position without the shock experienced when a jolt occurs in vehicles of this class as ordinarily constructed. The frictional contact of the loop portion of the snubber may be lessened if desired by applying oil thereto, and which tends to render leather, fabric and the like more elastic and more sensitive to any irregular motion of the vehicle body.

As indicated, my improved snubbing device is extremely simple in character, and is adapted to be applied either at the factory as an original part of equipment, or may be readily attached to such vehicles already in use, without the employment of special tools or equipment, as it is a common practice to provide bolt holes in the frame for attaching tire carrying brackets, and at which point my brackets 18 may be secured as indicated in Fig. 1.

I claim as my invention:

1. A snubber for vehicles, comprising a flexible member embodying guides and a tongue the latter being adapted to encircle a vehicle element and positioned between said guides, means for attaching said guides to the vehicle, and yielding means for attaching said tongue to said vehicle.

2. A snubber for vehicles comprising guide members, a tongue member extending from said guide members and adapted to be looped about a vehicle element and retained between said guide members, means for attaching said guide members to a vehicle, and means for attaching said tongue member to a vehicle.

3. The combination, in a vehicle, of an axle, a body, a spring therebetween, a snubber communicating with said body and looped about said axle, said snubber embodying guides and a tongue passing therebetween, and means connecting the tongue of said snubber to said vehicle to permit the movement of said snubber about said axle as said body raises and lowers by the action of said spring.

4. A snubber for vehicles, comprising a flexible member embodying guides and a tongue, a bracket for attaching said guides to a vehicle, means about which said snubber is looped, a spring secured to the opposite end of said snubber, and means for securing said spring to said vehicle.

5. The combination, with a vehicle, of a flexible member attached thereto and looped about an element of the vehicle, said member embodying a guide and a looping element, and means connected to said looping element of said flexible member and to said vehicle for controlling the movement of said member about said vehicle element.

In testimony whereof I affix my signature in the presence of two witnesses.

NORMAN R. KRAUSE.

Witnesses:
E. M. JOHNSON,
K. M. BOTT.